Oct. 7, 1924.　　　　　　　1,511,084
A. E. LINENDOLL
MOTOR EXHAUST HEATER
Filed June 19, 1922　　3 Sheets-Sheet 1
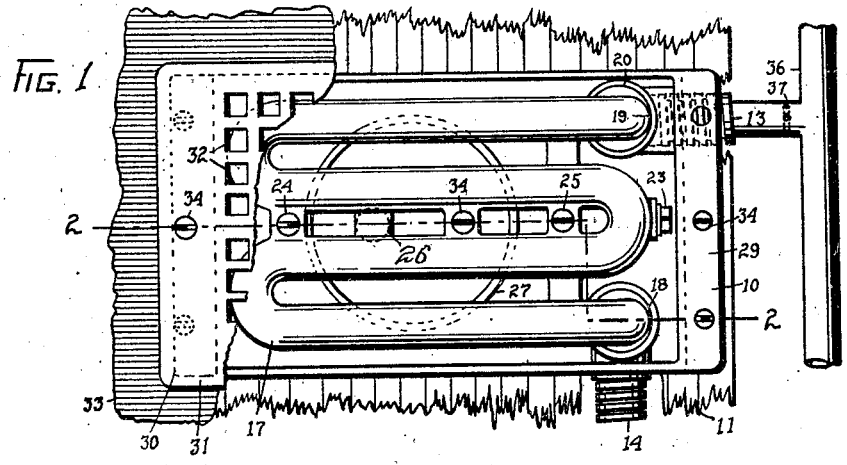
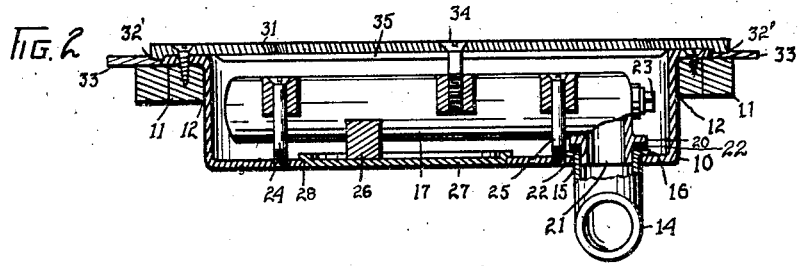
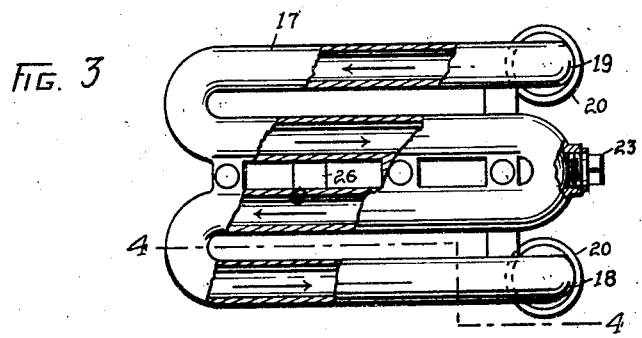
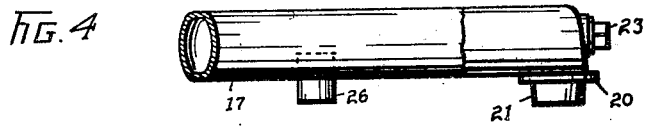
Inventor
Asa E. Linendoll
By Gray and Lilly
Attorneys Oct. 7, 1924.
A. E. LINENDOLL
MOTOR EXHAUST HEATER
Filed June 19, 1922
1,511,084
3 Sheets-Sheet 2
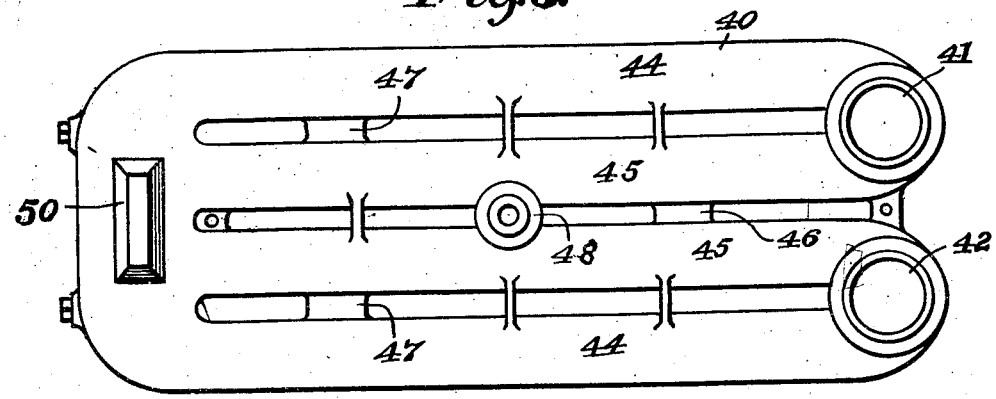
Fig. 5.
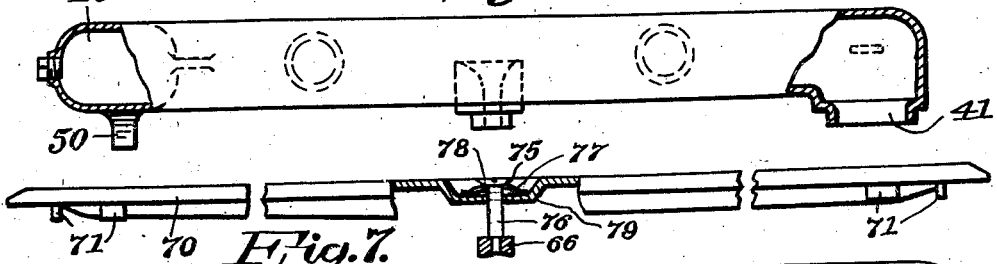
Fig. 6.
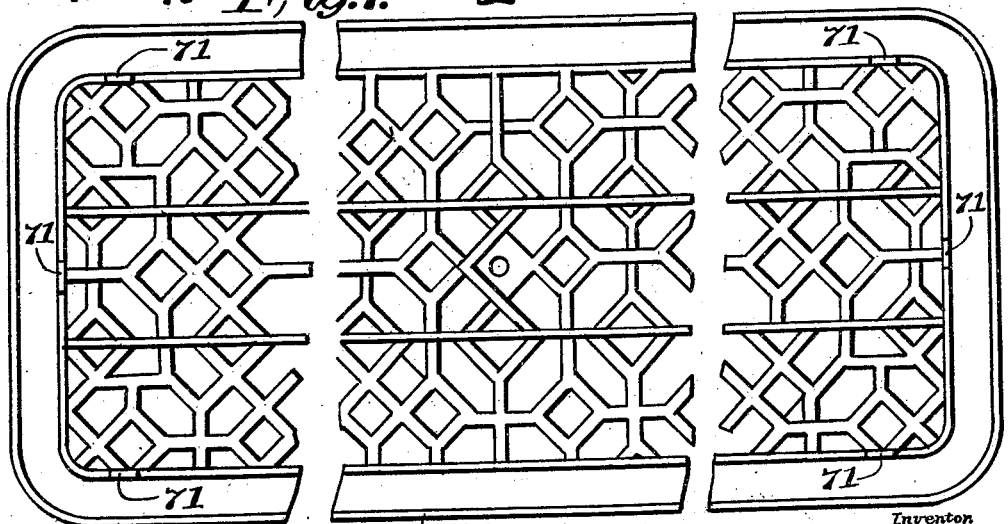
Fig. 7.
Fig. 8.
Inventor
A. E. Linendoll.
Gray & Lilly
Attorneys

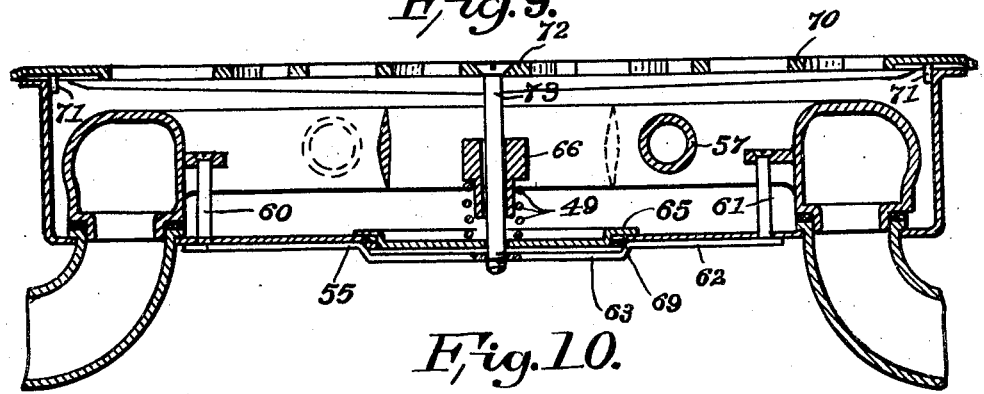
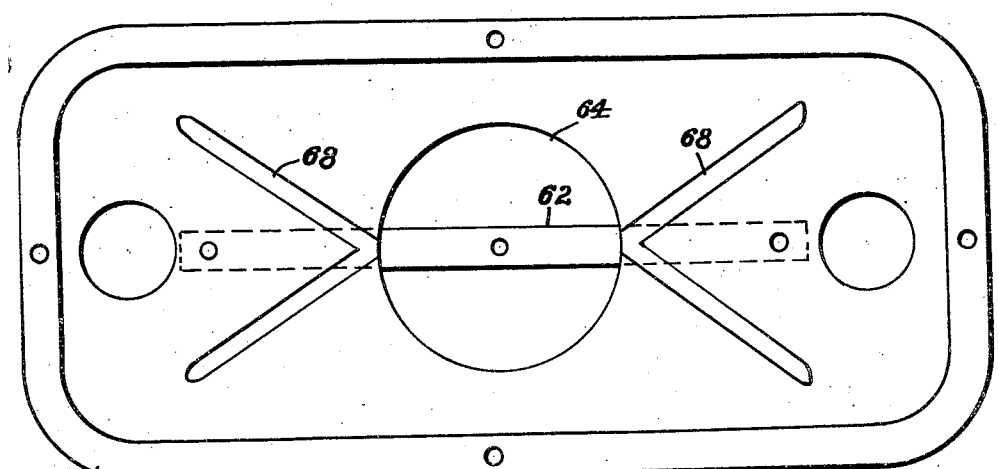
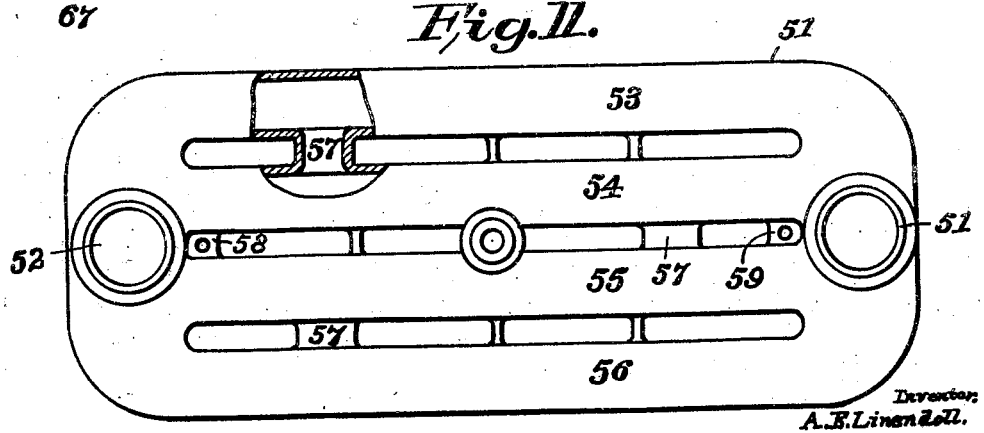

Patented Oct. 7, 1924.

1,511,084

UNITED STATES PATENT OFFICE.

ASA E. LINENDOLL, OF NORWALK, OHIO.

MOTOR-EXHAUST HEATER.

Application filed June 19, 1922. Serial No. 569,491.

*To all whom it may concern:*

Be it known that I, ASA E. LINENDOLL, a citizen of the United States, residing at the city of Norwalk, in the county of Huron and State of Ohio, have invented certain new and useful Improvements in Motor-Exhaust Heaters, of which the following is a specification.

My invention relates to heating devices, and particularly to a device adapted to utilize the exhaust of an internal combustion engine, such as are employed in automobiles, motor boats, air ships and other self-propelled vehicles, to warm compartments therein, thereby utilizing only the heat ordinarily wasted.

One of the objects of the invention is to provide a device of light weight, low cost and high heating efficiency designed with a view to making the heater attachable to an exhaust pipe on either side of a vehicle.

Another object of the invention is to provide a device in which the coil is so formed that pounding caused by the successive explosions of the motor will be eliminated or greatly reduced.

Another object of my invention is the provision of a device which can be easily disassembled for removing dirt from the heating coil and chamber.

Another object of my invention is the provision of a device adapted to be placed in the floor of a vehicle, and which can be disassembled from above.

Another object of my invention is the provision of a device suitable for use in the floor of an automobile and which will allow the escape of water through its bottom without allowing excessive entrance of dust through the drainage openings.

The manner of achieving these and other objects, set forth more precisely in the appended claims, will appear from the following description, reference being had to the accompanying drawings, in which, Fig. 1 is a plan view of the heater box, receptacle, or casing, with the heater coil therein, and a portion of the perforate cover plate in position at one end, the remainder being broken away to show the heater coil and heater box or casing.

Fig. 2 is a sectional view taken on the line 2—2 of Fig. 1.

Fig. 3 is a top plan view of the coil shown in Fig. 1, a portion of each length of the tubular coil being shown in section, the cleaning vent also being shown in section with the screw plug closure therein.

Fig. 4 is a sectional view taken on the line 4—4 of Fig. 3.

Fig. 5 is a bottom plan view of the preferred form of coil.

Fig. 6 is a side view of the coil shown in Fig. 5 with portions broken open at each end.

Fig. 7 is a side view, partially broken away, of a cover plate.

Fig. 8 is a bottom plan view of a cover plate.

Fig. 9 is a longitudinal section through a casing showing another form of coil therein.

Fig. 10 is a plan view of the casing shown in Fig. 9 with the coil removed.

Fig. 11 is a bottom plan view of the coil shown in Fig. 9.

Like characters of reference refer to like parts in the several views.

The numeral 10 designates the heater box or casing, which is preferably stamped from sheet metal and supported within an opening 12 in the flooring 11 so that the tubular connections 13 and 14 to the exhaust pipe 36 for the hot gases or products of combustion from the motor may be attached through the bottom of the heater box 10 to support one end of the coil 17.

The connection pipes 13 and 14 are preferably arranged with elbows which extend through holes 15 in the bottom of the casing 10, as shown in Fig. 2, being supported by a flange 16 on the elbows of each connection pipe 13 and 14. The heater coil 17 consists of a one-piece tubular construction which has two downwardly turned ends, 18 to enter the elbow of pipe 14 to the exhaust and 19 to enter the elbow of connection pipe 13 to the exhaust pipe 36 or to the escape. The downwardly turned ends 18 and 19 are each provided with a flange 20 and a tapered end 21 which extends down into the connection pipe 13 or 14, both of the downwardly turned ends 18 and 19 being arranged precisely similar so as to make the heater reversible for application to an exhaust pipe 36 on either side of a vehicle, that is, either end 18 or 19 may be an inlet or outlet for the hot gases, with a control valve 37.

The joint between the flange 20 of the heater coil and the flange 16 of the connector pipe 13 or 14 is thoroughly packed by a suitable gasket 22, preferably of asbestos, the tapered projection 21 extending down in a close fit within the connection pipe 13 or 14, as shown in section in Fig. 2.

The heating coil 17 is preferably made with three return bends, though more may be used, so that the outer tubes of the coil may be cleaned through the pipe ends 21. A cleaning vent with screw plug 23 is provided at the head of the central return bend so that both of the central tubes may be cleaned through the opening closed by said plug 23, thereby preventing the accumulation of carbon within the heating coil 17.

The heating coil is shown attached to the heater box or casing 10 by means of screws 24 and 25, which extend through connections between the central tubes and enter threaded holes in the bottom of the casing 10. The heating coil 17 is supported upon the two ends 18 and 19 and the downwardly extending lug 26, which performs the double office of holding the heater coil 17 level and locking plate 27 in the hole 28 in closed position by resting firmly thereon when the said heating coil 17 is fastened in position by the bolts 24 and 25. When desired, a lug similar to lug 50 shown in Figs. 5 and 6 may be used to limit the downward movement of the end of the coil distant from the inlet and outlet, in order to prevent unskilled persons from injuring the plate 27 by screwing that end of the coil down too far.

The heating box or casing 10 is preferably attached to the flooring 11 by means of suitable screws in the flanged ends 29 and 30, and a perforate cover plate 31 is provided which extends over the entire casing, the perforations or openings 32 in the cover plate 31 permitting the heat to rise freely into the interior of the motor driven vehicle, whatever it may be. The cover 31 is made with a downwardly extending edge rib 32' around the same to thereby hold the mat 33 firmly in position around the casing 10 in the opening 12. The cover plate may be fastened in position by means of one or more screws 34, as shown in Fig. 1, though the major portion of the cover plate is broken away in that figure.

The casing 10 and the coil 17 may be made of any suitable metal, aluminum, for example, and the cover plate is preferably made of cast aluminum with reinforcing rib 35 on the under side and the rib 32' previously described.

It is apparent that mud and dirt will accumulate within the casing and that it is necessary to clean the casing often. In order to open the casing to clean it, the cover plate is unscrewed and removed, after which the two screws 24 and 25 are withdrawn, thereby releasing the coil 17 so that it may be removed from the casing. The removal of the coil releases the cover 27 of the opening 28, so that the said cover 27 may be raised and the dirt within the casing removed through opening 28. When removed from the casing the heating coil is accessible for cleaning out any carbon in its passages through openings 18 and 19 and the vent left open by the removal of plug 23. The return of the coil is as easily accomplished as its removal, thus providing a heater which may be easily, quickly and thoroughly cleaned, and all the work done from above without working from beneath the floor of the vehicle.

The heating coil is preferably made of cast aluminum of sufficient thickness to deaden the sound of the exhaust. This construction also serves as a more even heating medium, preventing the heater from overheating and burning articles lying over the same, and also holds the heat better. The various parts are assembled in such a way as to be held very rigid, thus preventing any rattling.

Instead of the coil 17 shown in Fig. 1, I generally prefer to use the coil 40 shown in Fig. 5. The coil 40 has inlet and outlet openings 41 and 42 similar to openings 13 and 14, so that coils 17 and 40 are interchangeable in this respect. In the end distant from the openings 41 and 42 there is a chamber 43, and two outer tubes 44 and two intermediate tubes 45 connect the chamber 43 with the openings 41 and 42. In order to reduce or eliminate any pounding due to the successive explosions of the motor I provide by-passes between the tubes, one by-pass 46 between tubes 45 and a by-pass 47 between each tube 45 and the adjacent tube 44 being shown, and having been found sufficient to practically eliminate all noise due to this cause, though a greater or less number of by-passes may be used as conditions warrant.

A coil constructed in this manner might be made with lugs appropriate for fastening it in place in the same way as shown in Fig. 1, and it might rest on the cleanout cover in the same manner, but I have shown the coil 40 with a central lug 48 against which a spring such as spring 49 shown in Fig. 9 may abut to hold the cleanout cover plate in position. A lug 50 is shown on the bottom of the coil 40 and adapted to support the coil from the casing floor at the end distant from the openings 41 and 42. This lug 50 may be used whether the cleanout plate is held in position by a spring as shown in Fig. 9 or by a rigid lug as shown in Fig. 1. In the latter case the cover holding lug should be made just long enough to spring the cover plate slightly before the lug 50 contacts the floor of the casing.

Sometimes it is desirable to have the gases pass in at one end of the casing and out at the other end, in which case a coil like that shown in Figs. 9 and 11 may be used. This coil is shown with inlet and outlet openings 51 and 52 at opposite ends, and either of these openings may be used as the inlet or outlet as desired. The end openings are shown connected by four parallel tubes, 53, 54, 55 and 56, though a greater or less number could be used; and between each pair of adjacent tubes there is shown a by-pass 57, though a greater or less number of by-passes may be used if desired. Between the middle pair of tubes are shown lugs 58 and 59 through which screws 60 and 61 are screwed down into a reinforcing strip 62 on the bottom of the casing. This reinforcing strip 62 is bent downward in the middle where it passes under the cleanout opening 64 so as to leave a clearance between it and the cleanout cover plate 65. This cover plate is shown held in place by a spring 49 between it and a lug 66 on the coil. The casing 67 as shown in Fig. 10 is made with grooves 68 in its bottom. The casing is preferably made of sheet metal with these grooves stamped therein. The grooves are V shaped with their points at the cleanout opening 64, where they overlie the bent down portion 63 of the reinforcing member 62 and form drainage openings passing under the edge of cleanout cover plate 65. By this means any water getting into the casing is promptly drained out, and the drainage openings have the reinforcing member underlying them and the cover plate overlying them, so that they afford the least possible opportunity for the ingress of dust from beneath.

I prefer to hold the foraminous cover plate of the casing in place by one screw or fastening means. In the construction shown in Figs. 8 and 9 the cover plate 70 is shown having on its under side lugs 71 which hold it from turning on the casing, and a central opening 72 through which a screw 73 passes for securing the plate in place. This screw might pass into a lug in the coil, as shown in Fig. 1, but it is shown as passing through the central lug 66 down into the reinforcing member 62.

In order to hold the coil securely in position it is deemed best to use the screws as shown fastening the coil to the casing at each end; but I contemplate on occasion making one central screw 75 with a shoulder 76 bearing on the top of lug 66, and a spring 77 between its head 78 and a depression 79 in the cover plate 70, as shown in Fig. 7. In this construction one fastening means operable from above secures in assembled position or releases for cleaning the coil, the top plate and the cleanout cover plate, furnishing the maximum possible ease in assembling the device and in disassembling it for cleaning.

While I have shown several different embodiments of my invention, it will be noted that in all forms shown either opening may be used for inlet or outlet, making the device readily attachable to vehicles of different designs; and in all forms the casing may be readily opened from above, the coil removed, and both coil and casing cleaned without touching anything beneath the casing.

The manner of use will be obvious to anyone skilled in the art to which this invention appertains from the description given above.

What I claim is:—

1. In a heater, a casing having a cleaning opening in its bottom, a closure for said opening, an upwardly removable heating coil within the casing and over said opening and closure, and means accessible from above for fixing the coil and closure in position.

2. In a heater, a casing having a cleaning opening in its bottom, an upwardly removable closure for the opening, a heating coil within the casing resting upon and holding in position the closure, inlet and outlet slip connections for the coil so arranged as to leave the coil upwardly removable, an upwardly movable cover for the casing, and means accessible from above when the cover is raised for fixing in position the coil.

3. In a heater, a casing having an upwardly removable foraminous cover adapted to be placed substantially flush with a floor, there being a cleaning opening in the bottom of the casing, an upwardly removable closure for said cleaning opening, a heating coil within the casing holding in position said closure, inlet and outlet slip connections for said coil so arranged as to leave the coil upwardly removable, and means accessible from above for fixing said coil in position.

4. In a motor exhaust heater, a casing having a cleaning opening in its bottom, a closure for said opening seated on top of the bottom of the casing and removable upwardly therefrom, a heater coil in the casing, a lug carried by the coil and depending therefrom and engaged with the top of the closure to hold the latter in seated position on the bottom of the casing, means to connect the coil to the motor exhaust, and means operable from the top of the casing to secure the coil in position.

5. In a motor exhaust heater, a casing having a cleaning opening in its bottom, a closure for said opening seated on top of the bottom of the casing and movable upwardly therefrom, a heater coil in the casing, a lug carried by the coil and depending therefrom and engaged with the top of the closure to hold the latter in seated position on the bottom of the casing, means to connect the coil to the motor exhaust, perforated lugs carried by the coil, and screws passed through the perforations of the lugs and threaded into the bottom of the casing to force the first named lug into engagement with the closure.

6. In a motor exhaust heater, a casing having a cleaning opening in its bottom, a closure for said opening seated on top of the bottom of the casing and movable upwardly therefrom, a heater coil in the casing, means to connect the coil to the motor exhaust, and means borne by the coil and impinged against the closure for holding the latter seated on the bottom of the casing.

7. In a motor exhaust heater, a casing having a cleaning opening in the bottom thereof and having a pair of other openings, a closure for the cleaning opening seated on the casing bottom, a heater coil in the casing having depending inlet and outlet connections at one end extending through the respective openings of the pair of openings, such connections having parts to limit downward movement of the heater coil with respect to the casing bottom, means on the coil engaged on top of the closure for holding the latter against the casing bottom and for also holding the opposite end of the coil against downward movement with respect to the casing bottom, and means operable from the top of the casing for securing the coil downwardly with respect to the casing bottom.

8. In a motor exhaust heater, a casing having a pair of openings in the bottom thereof, tubular connections extending through the respective openings and having flanges seated above and upon the bottom of the casing, a heating coil in the casing, having depending tubular parts at one end telescoped into said tubular connections, flanges on said tubular parts of the heater coil overlying the flanges of the said tubular connections to limit downward movement of the coil with respect to the casing bottom, and means operable from the top of the casing for holding the coil against movement.

9. In a motor exhaust heater, a casing formed to be placed in an opening in the floor of an automobile and having a pair of openings in the bottom thereof, tubular connections communicating with the respective openings and connected to the casing, a heater coil in the casing having tubular parts, said tubular parts of the heater coil being removably connected with the tubular connections of the casing, means operable from the top of the casing to removably secure the heater coil to the casing and whereby upon disengagement of said means the heater coil may be lifted out of the top of the casing without disturbing said tubular connections of the casing.

10. In a motor exhaust heater, a casing formed to be placed in an opening in the floor of an automobile and having a pair of openings in the bottom thereof, tubular connections communicating with the respective openings and connected to the casing, a heater coil in the casing having tubular parts, said tubular parts of the heater coil being removably engaged with the tubular connections of the casing, means operable from the top of the casing to removably secure the heater coil to the casing and for holding the tubular parts of the heater coil in operative engagement with the tubular connections of the casing, whereby upon the disengagement of said means the heater coil may be lifted out of the top of the casing without disturbing said tubular connections of the casing, the casing having a cleaning opening for the removal of dirt, and a closure for the cleaning opening, the closure being secured in closing position by the securement of the heater coil within the casing and released by the removal of the heater coil.

11. In a heater, a casing adapted to be placed with its upper surface substantially flush with a vehicle floor and having inlet and outlet openings, means to connect the inlet opening with a source of heated fluid, an upwardly removable heating coil arranged horizontally within the casing with its inlet and outlet in operative relation with the inlet and outlet openings of the casing, and means operable from above for securing the coil in position, the coil having cleanout openings in its ends thereby rendering its horizontal ducts accessible for cleaning when the coil is raised from the casing.

12. In a heater, a casing, an upwardly removable coil within the casing, a cover for the casing, and a single fastening device operable from above for securing the cover on the casing or releasing it therefrom to render the coil accessible.

13. In a heater, a casing adapted to be placed with its upper surface substantially flush with the floor of a vehicle, and having a cleanout opening, a closure for the cleanout opening, means operable from within the casing for securing the closure in position, a cover for the casing having lugs on its under surface for preventing horizontal movement with respect to the casing, and a single fastening device for holding the cover down upon the casing.

14. In a heater, a casing adapted to be placed with its upper surface substantially flush with the floor of a vehicle, a foraminous cover for the casing, the casing having in its bottom a cleanout opening and grooves leading to said opening, and a closure for said opening having a flange overlapping the edge of the opening and leaving drainage ducts where said grooves extend under said flange.

15. In a heater, a casing adapted to be placed with its upper surface substantially flush with the floor of a vehicle, a foraminous cover for the casing, the casing having in its bottom a cleanout opening and grooves leading to said opening a closure for said opening leaving drainage ducts where said grooves reach said opening, and a member on the outside of the bottom of the casing overlapping said opening at the point where said grooves reach said opening.

16. In a heater, a sheet metal casing adapted to be placed with its upper surface substantially flush with a vehicle floor, a foraminous cover for the casing, a heater coil within the casing, a reinforcing strip on the bottom of the casing, and a fastening means passing through the cover and coil and releasably attached to the reinforcing strip.

17. In a heater, a sheet metal casing adapted to be placed with its upper surface substantially flush with the floor of a vehicle, there being a cleanout opening in the bottom of the casing and grooves leading to said opening, a flanged closure for said opening leaving drainage ducts under its flange where the grooves reach the opening, a reinforcing strip on the bottom of said casing bridging said opening beneath said drainage ducts, a foraminous cover for the casing, a heating coil within the casing, and fastening means securing the coil and cover to the reinforcing strip.

18. In a heater, a sheet metal casing adapted to be placed with its upper surface substantially flush with a vehicle floor, a cover for the casing, an upwardly removable coil within the casing, reinforcing means on the bottom of the casing, and means for securing the cover and the coil to said reinforcing means.

19. In a heater, a casing having an inlet opening, means for connecting said opening to the exhaust of a motor, an upwardly removable coil within the casing with its inlet in operative relation to said inlet opening, said coil comprising a plurality of substantially parallel spaced tubes, lugs between said tubes having vertical openings, means passing through said vertical openings and securing the coil in place within the casing and lugs between said tubes having horizontal openings forming by-passes between the tubes.

20. In a heater, a casing having inlet and outlet openings in its bottom at one end, an upwardly removable heater coil within the casing, and means operable from above for securing the coil in position, said coil comprising a chamber at the end distant from the inlet and outlet openings, a plurality of inlet ducts leading from the inlet opening to the chamber, a plurality of outlet ducts leading from the chamber to the outlet opening, and a by-pass from one of the inlet ducts to one of the outlet ducts.

21. In a motor exhaust heater, a coil comprising an inlet chamber, an intermediate chamber, an outlet chamber, a plurality of substantially parallel inlet ducts connecting the inlet chamber to the intermediate chamber, a plurality of outlet ducts substantially parallel to each other and to the inlet ducts and connecting the intermediate chamber to the outlet chamber, and by-passes connecting adjacent ducts.

22. In a heater, a casing having inlet and outlet openings in its bottom, a detachable cover for said casing, an upwardly removable coil within the casing with its inlet and outlet in operative relation with the inlet and outlet openings of the casing, and a single fastening device operable from above for securing the cover on the casing or releasing it therefrom to render the coil accessible.

In testimony whereof I hereunto affix my signature.

ASA E. LINENDOLL.